(No Model.) 5 Sheets—Sheet 3.

J. R. BRANDEN.
MACHINE FOR OPENING OUT METALLIC LATHING.

No. 390,441. Patented Oct. 2, 1888.

WITNESSES
John E. Wiles.
Th. B. Dogherty

INVENTOR
Jeffries R. Branden,
By W. W. Leggett
Attorney (No Model.) 5 Sheets—Sheet 4.

J. R. BRANDEN.
MACHINE FOR OPENING OUT METALLIC LATHING.

No. 390,441. Patented Oct. 2, 1888.

WITNESSES
John E. Wiles.
M. B. O'Dogherty

INVENTOR
Jeffries R. Branden
By W. W. Leggett,
Attorney (No Model.) 5 Sheets—Sheet 5.
J. R. BRANDEN.
MACHINE FOR OPENING OUT METALLIC LATHING.
No. 390,441. Patented Oct. 2, 1888.

WITNESSES
John E. Wiles
Th. B. Dogherty

INVENTOR
Jeffries R. Branden
By W. W. Leggett
Attorney

UNITED STATES PATENT OFFICE.

JEFFRIES R. BRANDEN, OF DETROIT, MICHIGAN, ASSIGNOR TO CHARLES C. HODGES AND HENRY C. HODGES, OF SAME PLACE.

MACHINE FOR OPENING OUT METALLIC LATHING.

SPECIFICATION forming part of Letters Patent No. 390,441, dated October 2, 1888.

Application filed February 17, 1888. Serial No. 264,343. (No model.)

*To all whom it may concern:*

Be it known that I, JEFFRIES R. BRANDEN, a citizen of the United States, residing at Detroit, county of Wayne, and State of Michigan, have invented a certain new and useful Improvement in Machines for Opening Out and Completing Metallic Lathing; and I declare the following to be a full, clear, and exact description of the invention, such as will enable others skilled in the art to which it appertains to make and use the same, reference being had to the accompanying drawings, which form a part of this specification.

This invention consists of the combinations of devices and appliances hereinafter specified, and more particularly pointed out in the claims.

This invention relates to the manufacture of sheet-metal lathing, such as is shown in the patent to Israel Kinney, No. 312,864, dated February 24, 1885, and more particularly to that part of the mechanism designed to open out the sheet metal after the same has been slitted and provided with corrugations at right angles to its slits. I term this machine the "opening-out machine," being the machine in which the fabric is finished.

Figure 1:
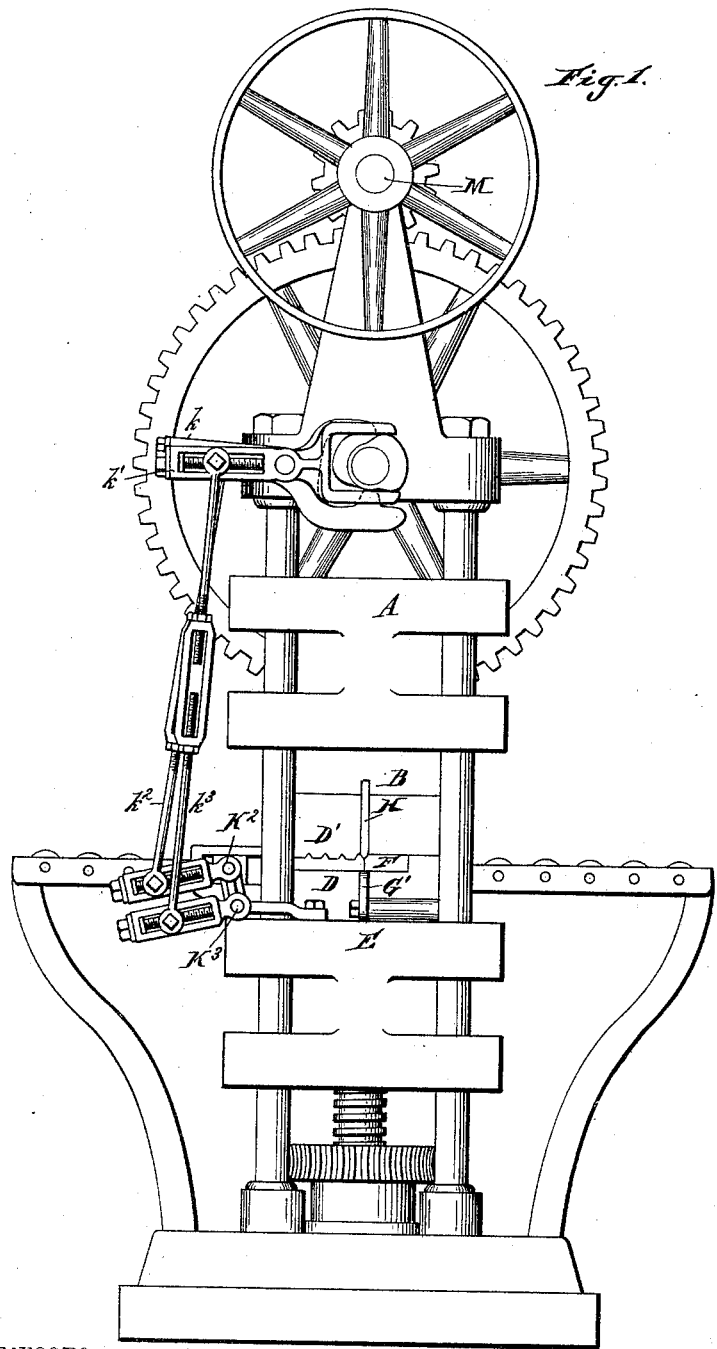
Figure 2:
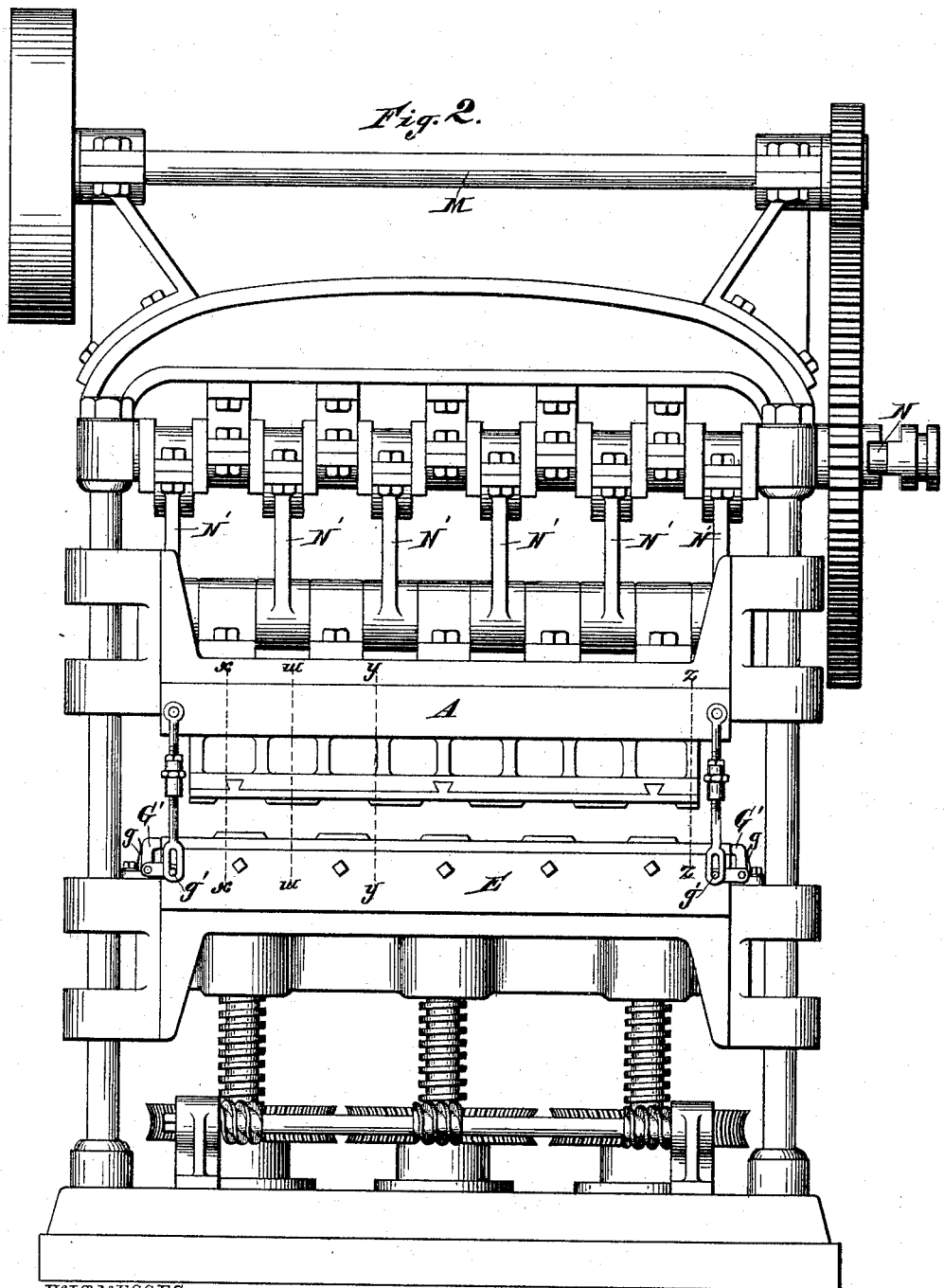
Figure 3:
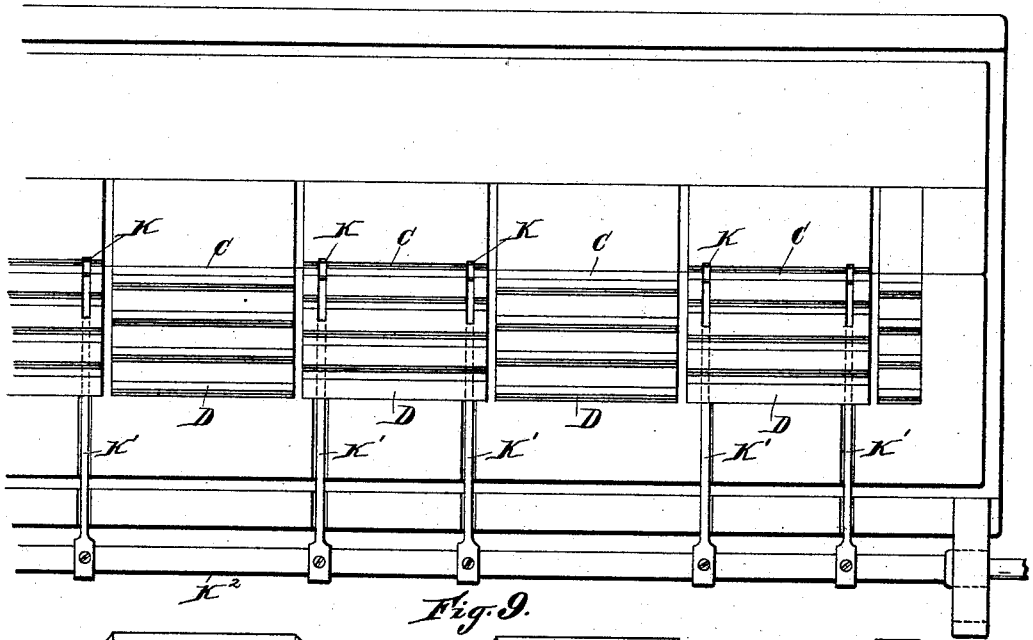
Figure 9:
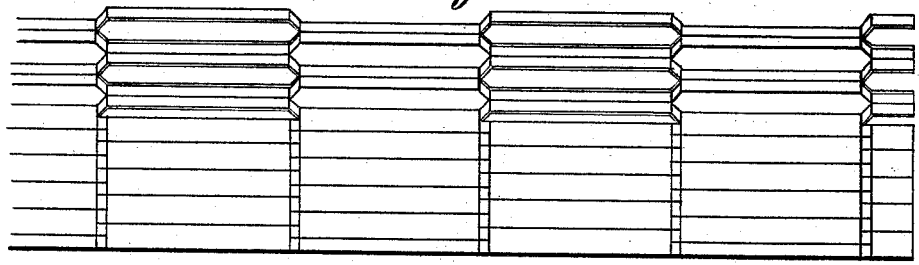
Figure 10:
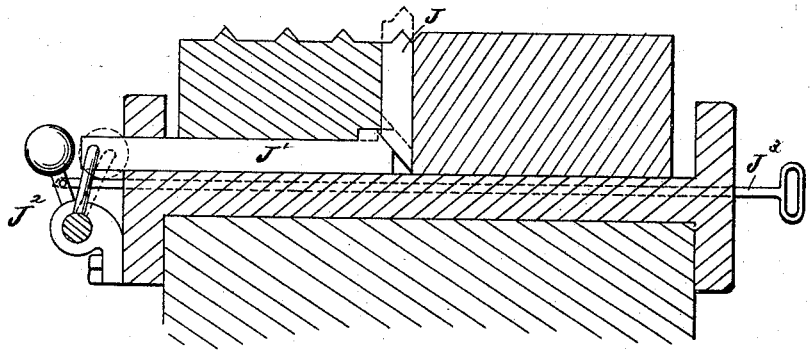
Figure 4:
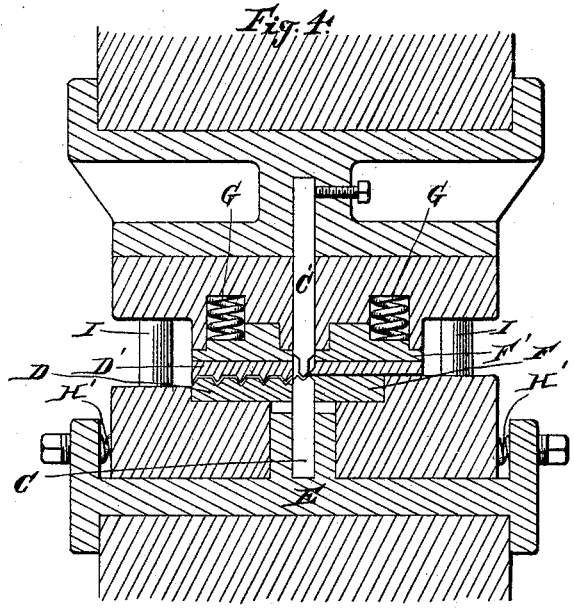
Figure 5:
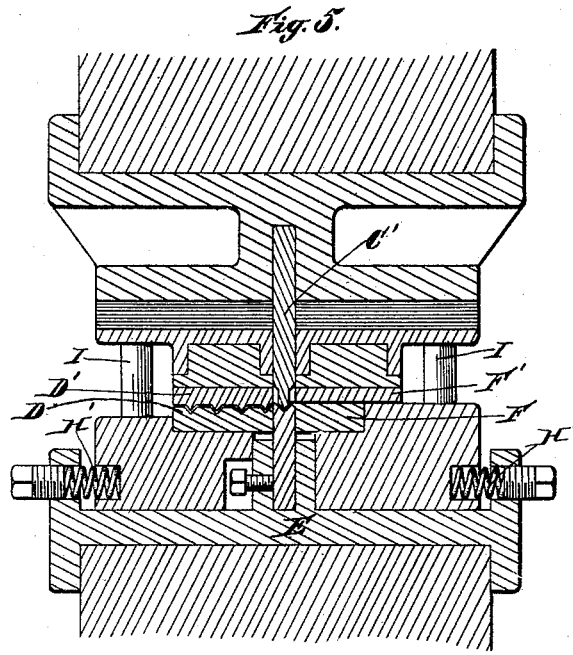
Figure 6:
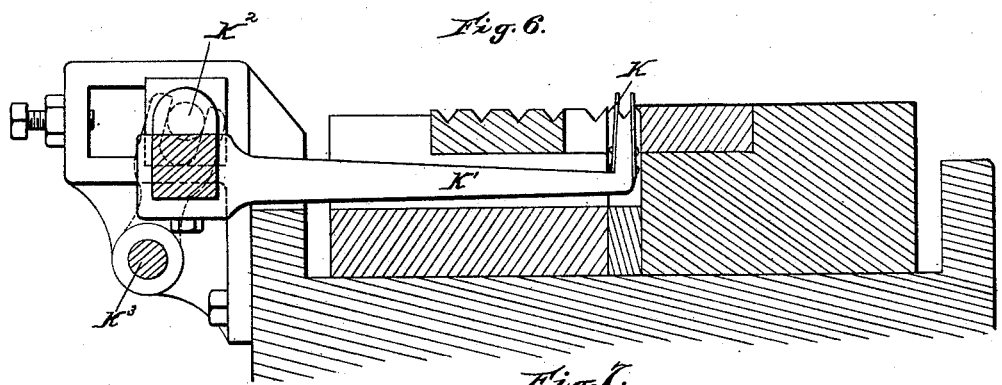
Figure 7:
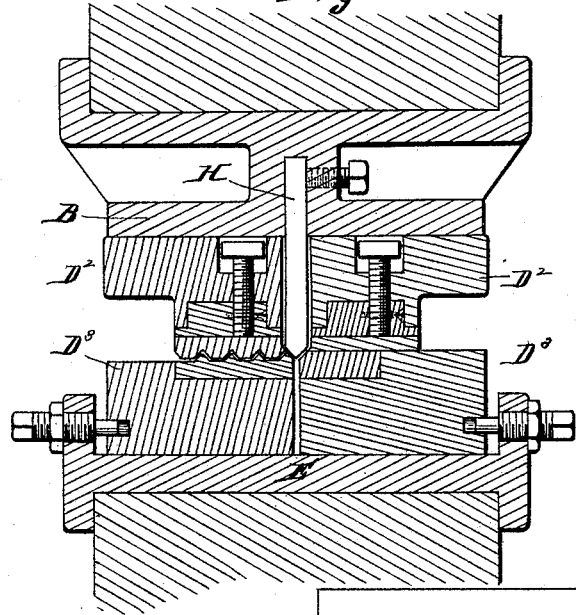
Figure 8:
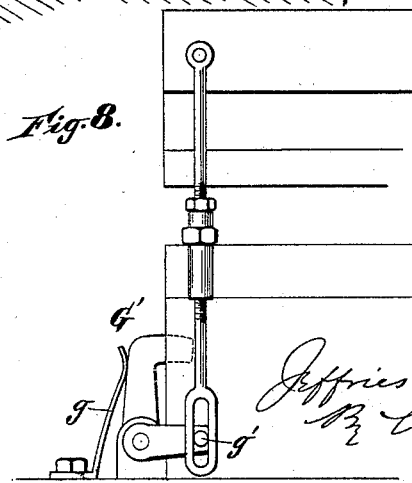

In the drawings, Figure 1 is a side elevation, and Fig. 2 a front elevation, of a machine embodying my invention. Fig. 3 is a plan view of the lower platform with its die-plates. Fig. 4 is a section on the line $w\,w$, Fig. 2. Fig. 5 is a section on the line $x\,x$ of Fig. 2. Fig. 6 is a section on the line $y\,y$ of Fig. 2. Fig. 7 is a section on the line $z\,z$ of Fig. 2. Fig. 8 is an enlarged view of the separating mechanism for separating the lower dies. Fig. 9 represents a sheet which has been slitted and corrugated and partly opened out by this opening-out machine. Fig. 10 is a section illustrating the gage against which the metal is adjusted.

A is the frame-work; B, an upper platen, carrying what I term, respectively, the upper folding and setting dies C' and D', respectively.

E is the lower platform, supporting the lower folding and setting dies, C and D, respectively.

F is a flat plate on the lower platform, adjacent to the folding-dies and the entering side of the machine.

F' is a similar plate on the upper platen, B.

The setting-dies D' and plate F' are provided with springs G, to cushion their action upon the sheet of metal.

H represents wedges, there being one at each end of the machine. They are attached to the upper platen.

I represents dowels, shoulders, or other suitable engaging devices, whereby, as the platen descends, the frame $D^2$ of its setting-dies may firmly engage the corresponding frame, $D^3$, of the lower setting-dies before the wedges H come into action. The wedges H are designed to enter between the said frame $D^3$ and plate F as the platen further descends, and force them apart, for a reason which will shortly appear, and H' are springs for returning the dies to place after the wedges recede.

G' represents dogs, of which there is one at each end of the machine. These dogs are so constructed, as shown, that when the wedges have fully accomplished their work the dogs will, by the springs $g$, be thrown into the opening and hold the frames apart until the wedges have retracted beyond the entering point and the dies have separated and released the plate. Then before the upper and lower plates have themselves become disengaged these dogs are tripped by the stud $g'$, and the frames $D^2\,D^3$ again resume their normal positions.

J represents guides or stops. They are connected by a bar, and rest by beveled bearings upon the beveled ends of bars J'. These bars J' are arranged, as shown, to be thrust in or out by the action of a weighted lever, $J^2$, and connecting-rod $J^3$, which holds them in position to stop and properly locate the metal sheet as it is inserted in the machine. The weighted lever $J^2$ may be tilted by hand at the will of the operator. When it is tilted in one direction, as shown, its gravity acts on one side of its fulcrum, thus holding the stops up in place to arrest and adjust the sheet of metal. At the same time the descent of the platen forces down the guides, thereby automatically tilting the lever $j^2$ back to its original position, and the stops remain out of use until when about to enter another sheet they are thrown again into position by the operator by throwing over the weighted arm.

K represents feeding-fingers. They are in the form of open forks. They are by their arms K' and connections K² K³ given a motion forward, then downward to release their hold, then backward beneath the sheet of metal, then upward to take a new hold, and then forward, as before. This motion is accomplished as follows: Upon the main shaft, as shown in Fig. 1, are two pivoted yokes, $k\ k'$, engaged with corresponding eccentrics upon the shaft. Connecting-rods $k^2\ k^3$ connect them, respectively, with the shafts K² and K³. (Shown in Fig. 6.) We will suppose the fingers to be in the position shown in Fig. 6. The further rotation of the main shaft will depress the connecting-rod $k^3$. This will tilt the shaft K³, thus throwing the arm K' and the fingers to the left and feeding the sheet forward to the same extent. The further rotation of the main shaft will then lift the connecting-rod $k^2$. This will tilt the shaft K², thus dropping the arm K' and the fingers K. As the shaft further revolves, the connecting-rod $k^3$ will be lifted, thus tilting the shaft K³ and again carrying the fingers K to the right. Just at this time the further revolution of the main shaft depresses the connecting-rod $k^2$, thus tilting the shaft K², which lifts the fingers to the position in Fig. 6, where they take a new hold upon the metal.

M is the drive-shaft; N, a cam-shaft, and N' pitmen which engage the cams and reciprocate the platen B.

The operation of the machine is as follows: A sheet of metal is taken which has been properly slitted and corrugated, as shown in Fig. 9. This sheet is placed in the machine and brought forward against the stops J, which brings the unslitted spaces in each line of slits opposite the folding-dies C C', the machine is thrown into gear with the driving mechanism, and the platen descends. As the platen descends, the folding-dies fold the metal ninety degrees, more or less, according as they are shaped. It will be observed, however, that by reason of the corrugations at right angles to the slits this folding of the metal serves to open out or elongate the sheet. The wedges H are designed for this purpose and serve to spread the setting-dies away from the folding-dies just at this instant and just enough to accommodate the elongation referred to. The platen now rises, and as it rises clear from the metal the feeding-fingers K will have risen and embraced the folded strips of metal. They then carry the sheet forward one space and leave the folded strips over the first of the setting-dies C. The platen again descends with its dies, which again perform their work. The fingers K drop down free from the sheet, come back, rise, and engage the next folded strip, and the wedges H cause the setting-dies to separate from the folding-dies, as before. Then as the platen descends the fingers K carry the sheet forward one space farther. It is thus seen that after being folded by the folding-dies the metal is subjected to the setting action of the setting-dies, and when it emerges from the machine is very uniform and perfect.

The folding and setting dies may each be readily removed from the machine for the purpose of re-dressing or repairs, and they may be replaced with folding and setting dies of other shapes corresponding with any desired variation in the construction of the fabric. Thus, for instance, the spaces between the lines of slits might be made wider or narrower, which would require a corresponding change in the said dies. So, also, it might be desirable to fold the metal to a greater or less degree, which would require a corresponding change in the folding and setting dies. So, again, the corrugations at right angles to the slits might be made deeper or more shallow, or the lengths of the slits might be longer or shorter with respect to the lengths of the slitted portions, all of which changes might be readily accommodated by changing the dies.

The action of the folding-dies is to slightly draw or distort the sheet at this point, so that if the sheet were fed from its extremity it might be difficult to bring it with certainty into proper position for the following actions of the folding-dies. It is therefore important that the feeding mechanism should engage the metal closely adjacent to the folding-dies and feed it forward.

What is claimed is—

1. The opening-out machine for metallic lathing, consisting of the series of folding and setting dies with their corresponding counter-dies, between which the sheet is fed, and the means, substantially as described, for feeding the sheet.

2. In a machine for opening out a sheet in the manufacture of sheet-metal lathing, the combination of the series of stationary folding and setting dies, and a corresponding counter series fixed above the latter to a movable platen, said folding-dies adapted to strike the unslitted portion of the metal along the line of slits and fold the same, thereby opening out or elongating the sheet, and said setting-dies constructed to receive the opened-out portions of the sheet and to set the same, substantially as described.

3. In a machine for opening out a metallic sheet in the manufacture of metallic lathing, as described, the combination, with the folding and setting dies, of feeding mechanism, substantially as described, adapted to engage the metal adjacent to the folding-dies and to feed the same forward one space, substantially as and for the purpose described.

4. In a machine for opening out the sheet of metal in the manufacture of metallic lathing, the combination, with folding-dies, of the series of setting-dies adjacent thereto, and the means, substantially as described, for causing said setting-dies to move forward from the folding-dies as the metal is opened out, substantially as and for the purposes described.

5. The combination, with the folding and setting dies, of the flat plates for gripping the metal between the folding-dies and the entering end of the machine, said upper plate and upper dies cushioned with springs, substantially as and for the purpose described.

6. The combination, with the upper and lower dies, of wedges adapted to force said dies forward from the folding-dies, and springs for retracting them after the dies have separated, substantially as described.

7. The combination, with the setting-dies and the mechanism, substantially as described, for causing said dies to move forward away from the folding-dies, of dogs G', constructed to hold the said dies in their new position until the platen has risen and released the sheet, substantially as and for the purposes described.

8. The combination, in a machine for opening out sheet-metal lathing, of the series of folding and setting dies and their corresponding counter-dies with the reciprocating and rising and falling sheet-feeding fingers K, having the arms K', the rocking shafts $K^2$ $K^3$, the connecting-rods $k^2$ and $k^3$, the yokes $k$ $k'$, and the shaft having cams, substantially as described.

9. The combination, in a machine for opening out sheet-metal lathing, of the series of folding and setting dies and their corresponding counter-dies with the reciprocating and rising and falling sheet-feeding fingers K, substantially as described.

In testimony whereof I sign this specification in the presence of two witnesses.

JEFFRIES R. BRANDEN.

Witnesses:
  M. B. O'DOGHERTY,
  JOHN E. WILES.